(12) United States Patent
Charron

(10) Patent No.: US 7,007,889 B2
(45) Date of Patent: Mar. 7, 2006

(54) FLEXIBLE AIRFOILS AND METHOD

(76) Inventor: Richard Charron, 4529 E. Willow Pond Ct., West Palm Beach, FL (US) 33417-8243

( * ) Notice: Subject to any disclaimer, the term of this patent is extended or adjusted under 35 U.S.C. 154(b) by 0 days.

(21) Appl. No.: 10/869,106

(22) Filed: Jun. 15, 2004

(65) Prior Publication Data

US 2005/0274847 A1    Dec. 15, 2005

(51) Int. Cl.
*B64C 33/02*    (2006.01)
(52) U.S. Cl. .................. 244/16; 244/35 R; 244/22; 244/72; 244/123
(58) Field of Classification Search .................. 244/11, 244/22, 64, 72, 123, 901–905, 153 R, 155 A, 244/45 R, 45 A, 219, 16; 114/39.14, 108, 114/102.12, 102.22, 102.24, 102.25, 102.26, 114/102.27
See application file for complete search history.

(56) References Cited

U.S. PATENT DOCUMENTS

| | | | | |
|---|---|---|---|---|
| 1,364,174 | A | * | 1/1921 | Bird .............................. 244/22 |
| 4,053,122 | A | * | 10/1977 | Gar ............................... 244/11 |
| 4,198,019 | A | * | 4/1980 | Linczmajer .................. 244/123 |
| 4,363,458 | A | * | 12/1982 | Jones et al. ............. 244/153 R |
| 5,170,965 | A | * | 12/1992 | Yasuda ......................... 244/65 |
| 5,275,117 | A | * | 1/1994 | Magnan ....................... 114/108 |
| 6,364,251 | B1 | * | 4/2002 | Yim ........................ 244/153 R |
| 2003/0230672 | A1 | * | 12/2003 | Charron ......................... 244/72 |

* cited by examiner

*Primary Examiner*—Galen Barefoot
(74) *Attorney, Agent, or Firm*—McHale & Slavin, P.A.

(57) ABSTRACT

An airfoil for use in kites, movable wing aircraft and fixed wing aircraft has a straight spar inserted into a sleeve in the arcuate leading edge of a flexible wing panel. The resultant forces on the spar dynamically shape the airfoil. The airfoil is reinforced by battens between the leading edge and the trailing edge of the wing panel. Flight control is maintained through control lines warping the airfoil.

15 Claims, 6 Drawing Sheets

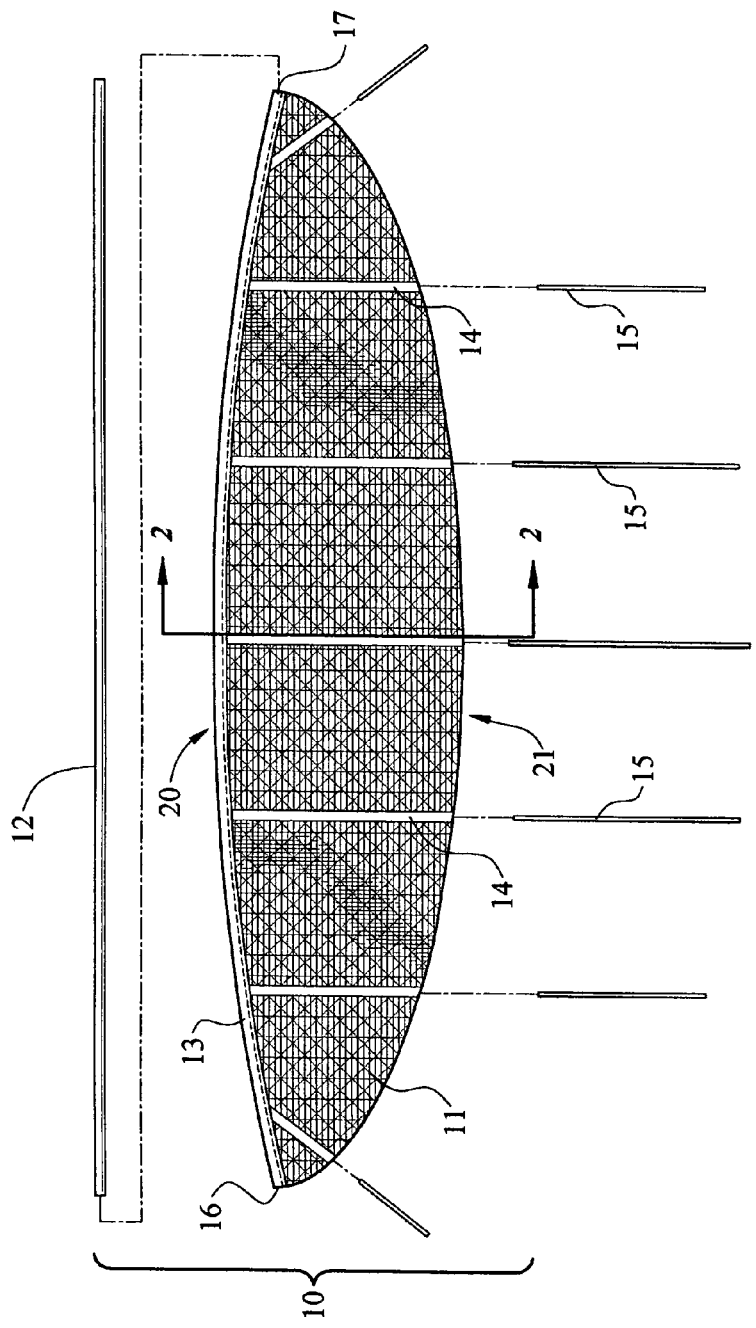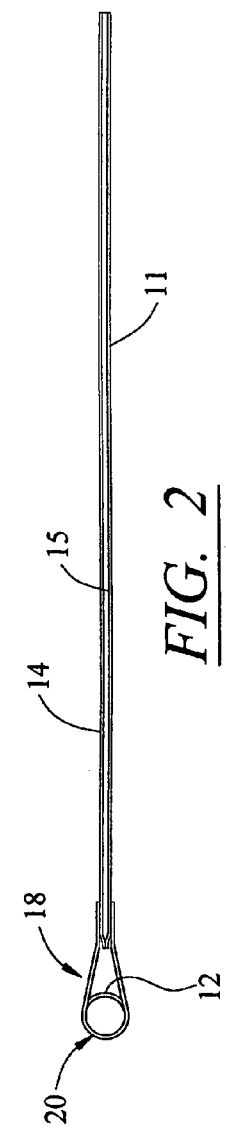

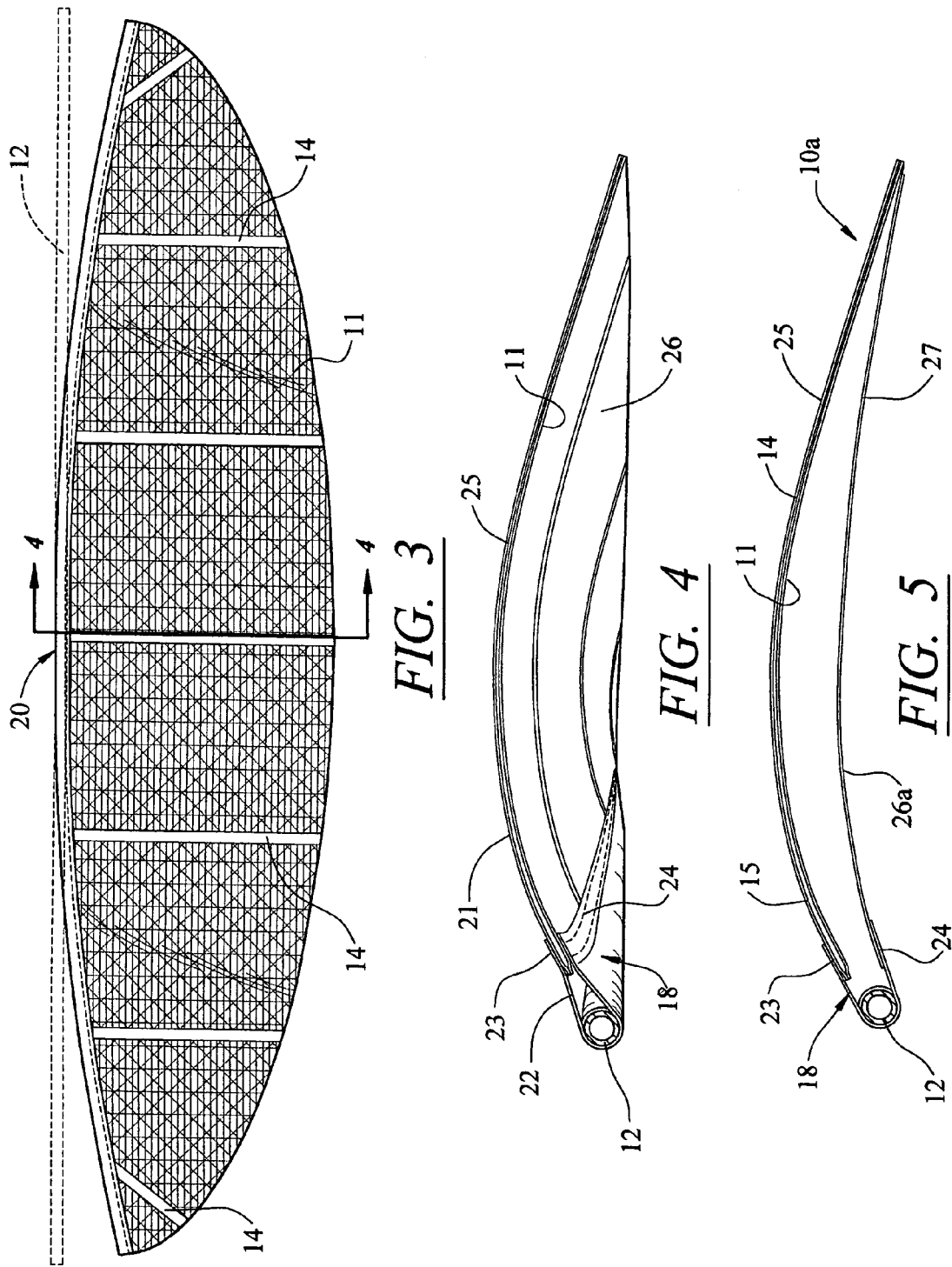

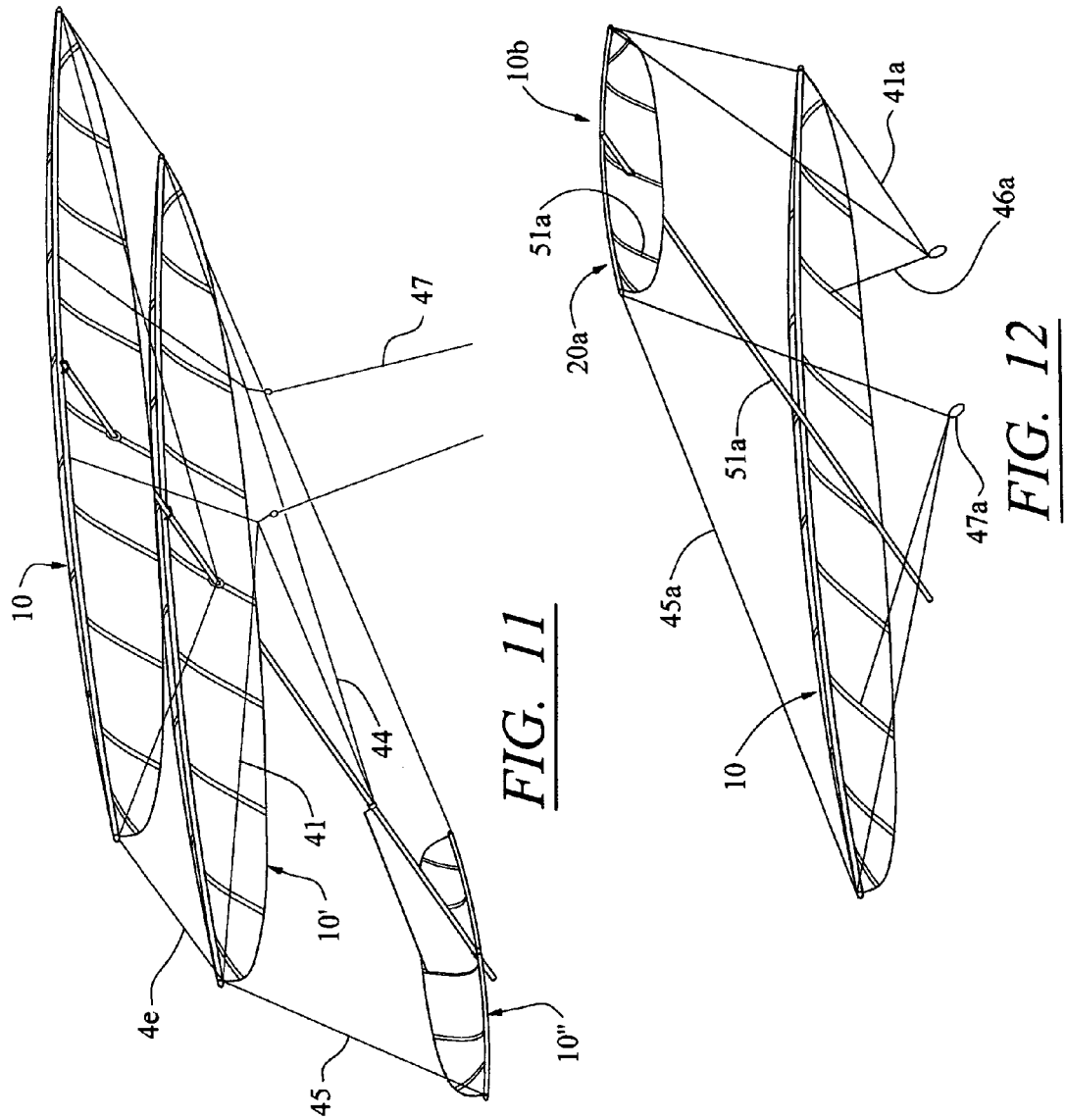

FLEXIBLE AIRFOILS AND METHOD

BACKGROUND OF THE INVENTION

1. Field of the Invention

This invention relates to the field of flexible airfoils for aircraft or kites with ESTOL (extreme short take off and landing) characteristics, either manned or UAV (unmanned aerial vehicle) and tethered or untethered which use wing warping for flight control.

2. Description of the Prior Art

The Rogallo wing is a well known flexible wing useful for hang gliding with flight control depending on shifting the weight of the pilot. The shifting of weight is translated to the wing by cables attached between the wing and a frame supporting the pilot.

A kite having a flexible wing stretched between a leading edge spar and a trailing edge spar is taught by Barresi, U.S. Pat. No. 5,213,289. The airfoil is shaped by inflation of cells in the wing. Control lines are attached to the respective ends of the spars and terminate in right and left control handles. The control lines flex the spars through the control lines to execute maneuvers by the kite.

Another flexible wing that is shaped by ram air is taught by Snyder, U.S. Pat. No. 5,160,100. The flexible canopy is propelled by a small engine and pusher propeller mounted on an airframe that carries the pilot. Control lines extend from the inflatable cells to a movable bar connected to the airframe. Flight control is maintained by movement of the bar translated to the wing through the control lines.

Villinger, U.S. Pat. No. 6,293,490, discloses an aircraft or hang glider with a airframe for supporting the pilot and right and left control lines for raising and lowering the trailing edge of the flexible wing. The trailing edge is stiffened by a spar.

SUMMARY OF THE PRESENT INVENTION

It is an objective of this invention to provide an airfoil which is dynamically shaped by the interaction of the leading edge spar and the pattern of the flexible wing panels.

It is another objective of this invention to provide an airfoil capable of controlled flight by wing warping.

It is a further objective of this invention to provide high lift, low drag, and cambered airfoil capable of low speed flight.

It is yet another objective of this invention to provide an airfoil that is simple in design and easy to fabricate.

It is a still further objective of this invention to provide an airfoil that is capable of use in kites, fixed wing aircraft and ornithopters.

SHORT DESCRIPTION OF THE DRAWINGS

FIG. 1 is a top plan view of the wing panel, stiffeners and spar of this invention;

FIG. 2 is a cross section along line 2—2 of FIG. 1 with the spar inserted into the wing panel;

FIG. 3 is a top plan view of the airfoil of this invention with the spar in phantom lines;

FIG. 4 is an end view of the airfoil of FIG. 3 partially in section along line 4—4;

FIG. 5 is an end view of a modification of FIG. 4, partially in section, showing upper and lower surfaces with thickness;

FIG. 11 is a perspective of the aircraft of FIG. 8 in flight;

FIG. 12 is a perspective of an aircraft and airfoil of this invention oriented as a forward canard.

DETAILED DESCRIPTION OF THE INVENTION

Figures 6, 7:
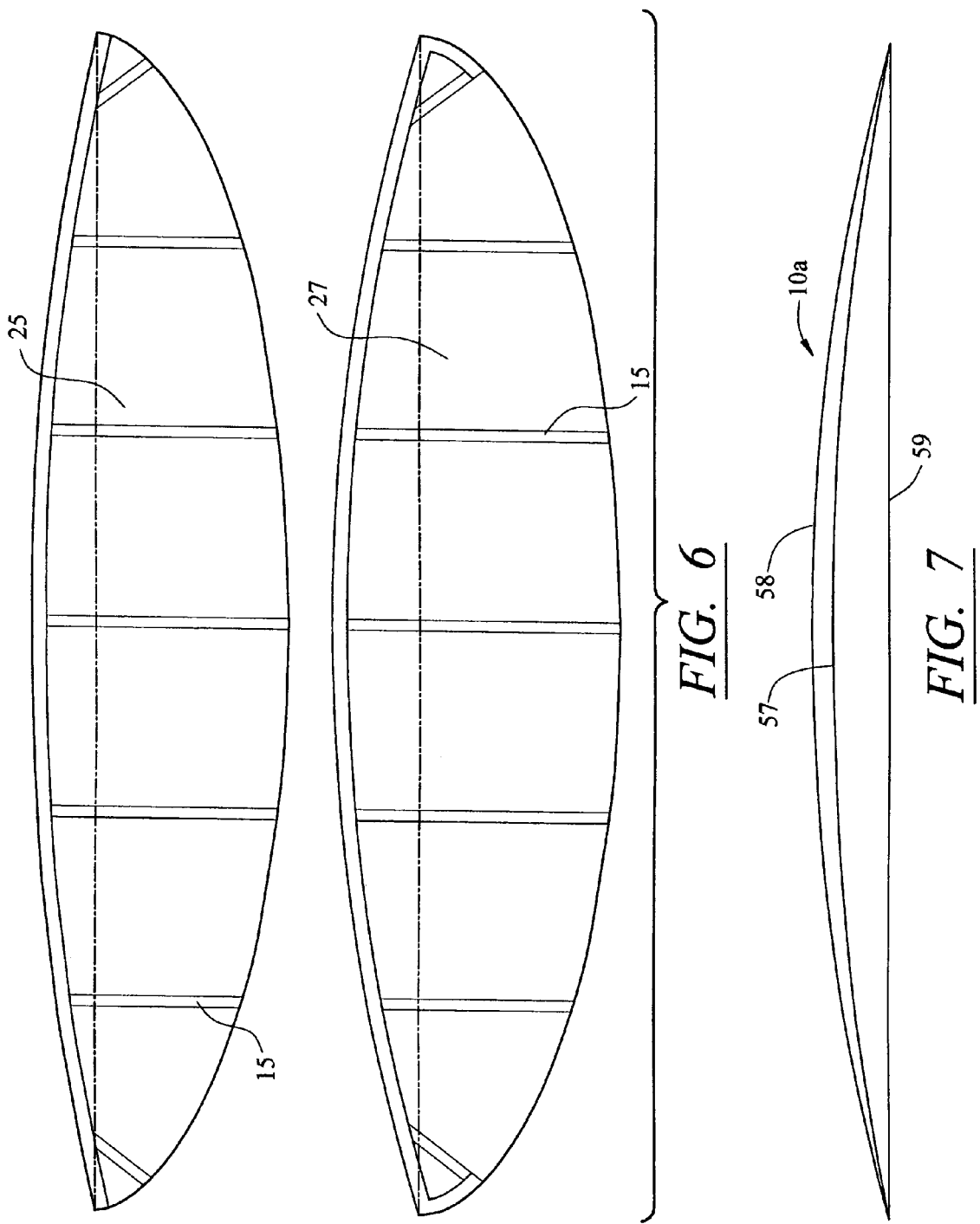
FIG. 6 is a top plan view of the flat pattern of the upper and lower wing panels of FIG. 5.
FIG. 7 is a top plan view of the leading edge of the wing panels of FIG. 6.
Figure 9:
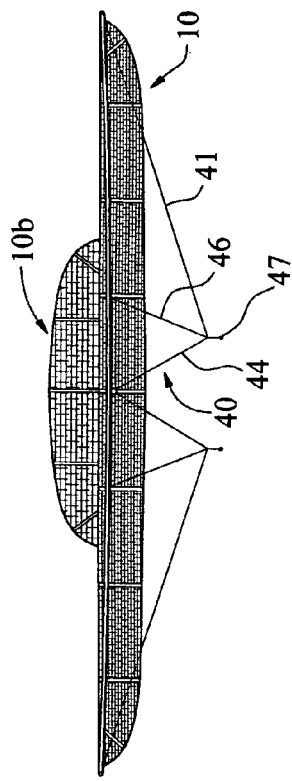
FIG. 9 is a front view of the aircraft of FIG. 8.

The airfoil 10 may be manually assembled before flight or it may be pre-fabricated. The wing panel 11 is preferably made from a nylon rip stop material however, it may be made of other flexible materials such as parachute cloth, "Kevlar", natural or synthetic fiber sail cloth or various films of requisite strength and flexibility. The airfoil 10 has an arcuate leading edge 20 extending from one wing tip 16 to the other tip 17. The wing panel 11 may be cut or otherwise formed in the arcuate shape of the leading edge 20. The wing panel may have a straight edge joined to the leading edge to conform to the arcuate shape. The trailing edge 21 of the wing panel is free. In the Figs., the trailing edge 21 and the leading edge 20 intersect in elliptical wing tips 16, 17 though other tip shapes may be used.

The spar 12 is preferably made of a carbon fiber tube of a length to extend from wing tip to wing tip. Obviously, other materials may be used including natural materials, such as wood, or metal, such as aluminum, or other polymeric compositions. The spar 12 has the characteristics to be flexed by the wing panel 11 to conform to the arcuate shape of the leading edge 20 and the strength to withstand the aerodynamic forces of lift and controlled flight. The spar 12 is formed as a straight tube or rod. As the straight spar is attached to the arcuate leading edge of the wing panel, the dynamic bending forces created in the spar and the flexible panel shape the airfoil 10. The spar may be permanently attached to the wing panel, if desired.

The airfoil has a chord or width which is greater in the center and tapers toward each wing tip in an arc, as shown in FIG. 7. Spaced along the length of the airfoil are stiffeners 15 oriented along the chord. the stiffeners 15 or battens reinforce the airfoil and maintain the shape of the airfoil 10. The stiffeners nearest to each wing tip are oriented perpendicular to the trailing edge of the wing panel. The stiffeners may be inserted into closed tunnels 14 formed on the wing panel or the battens may be attached directly to the wing panel mechanically or by chemical bond.

In FIGS. 3–4, the airfoil 10 is shown formed with a camber 21 which reduces the stall speed of the airfoil and allows ESTOL. In FIG. 4, a sleeve 18 is shaped from a separate hem material 22. The hem is folded upon itself and the free edges are attached to the edge of the wing panel 11. The seams 23, 24 may be mechanical, such as sewing, stapling, riveting or chemical as by heat and pressure, solvent bonding, autologous bonding or adhesive bonding. The wing panel 11 includes the upper surface 25 and the lower surface 26 of the airfoil.

In FIG. 5, a modification of the airfoil is shown with a second wing panel 27 forming the lower surface 26a of the airfoil. The second wing panel 27 may have different leading edge arc dimensions than the first wing panel 11. The sleeve 18 has one free end attached to the upper surface by seam 23 and attached to the second wing panel by seam 24. In this manner, a thickness is created in the airfoil with the width of the upper surface being substantially larger than the width of the lower surface. The thickness produces a high lift wing and reduces drag.

As an example of the airfoil of this invention, illustrated in FIGS. 5–7, the upper wing panel 11 forms the upper wing surface 25. This panel is formed with a leading edge arc 57 having a radius of 107.5 inches. The lower surface 26a is formed from the second wing panel 27 with a leading edge arc 58 having a radius of 152.7 inches. The straight length 59 from wing tip to wing tip is 46.5 inches for both wing panels. The wing panels 11 and 27 are made from ¾ oz. rip stop nylon. These arcs intersect at the opposite wing tips. The space between the upper panel and lower panel provides the camber and the thickness in the wing. The spar 12 is a 0.230 inch diameter carbon fiber tube 48 inches in length. The battens are 0.190×0.050×length to fit taped to wing panels on approximately 7 inch centers. As assembled, the airfoil 10a operates in a very low Reynolds number with an airfoil section approximating NACA 9201 upper surface; and NACA 4201 lower surface; and together they are approximately NACA 7205.

As shown, the spar 12 is continuous from wing tip to wing tip. However, in an aircraft having an airframe with a fuselage, the continuous spar could carry through the fuselage with wing panels on each side of the aircraft. Also, the airfoils 10 could be attached at a wing tip to a fuselage providing a complete airfoil on each side of the aircraft. Either with the carry through or the wing tip attachment, the wing panels may have a dihedral in relation to the center portion.

Figure 10:
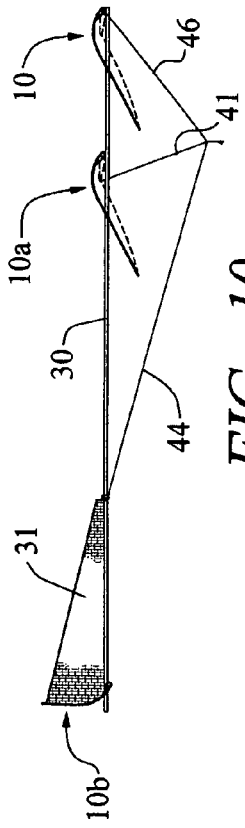
FIG. 10 is a side view of the aircraft of FIG. 8.
Figure 8:
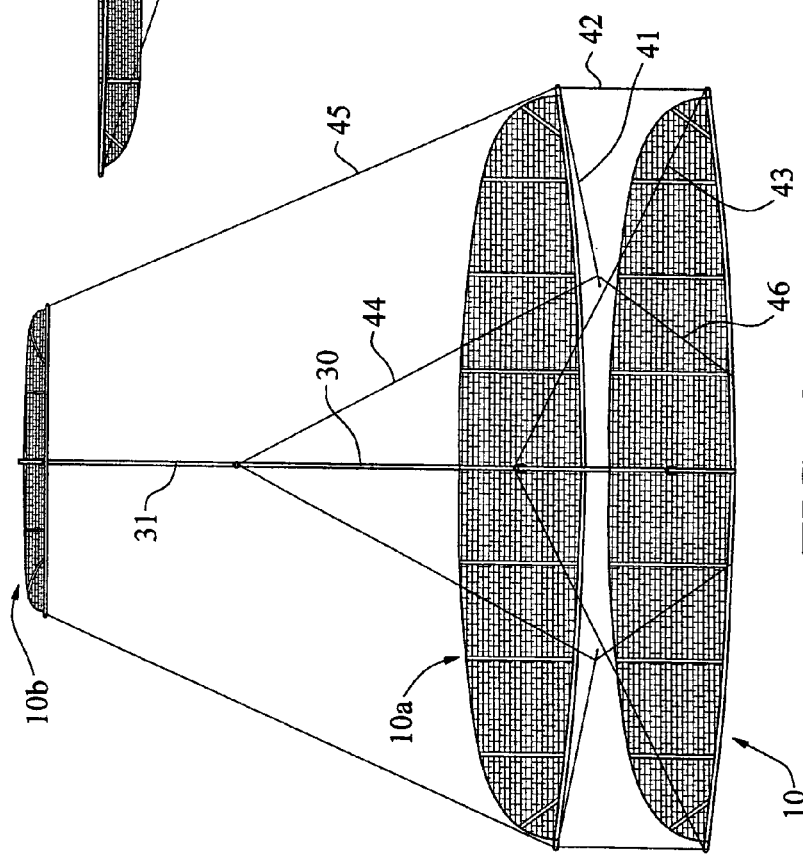
FIG. 8 is a top plan view of a aircraft and airfoil of this invention.

FIGS. 8–11 illustrate an aircraft using three airfoils 10, 10a and 10b for lift and maneuverability. In this instance, the aircraft is a two line stunt kite with an airframe 30 connected to the center of the air foils though 4 lines may be used for greater control. Control lines 40 are connected to the airfoils to provide flight control by wing warping. As shown in FIGS. 8–11, the control lines for one side of the aircraft are shown with the control lines on other side being a mirror image. Beginning in level flight, a turn to the left is initiated by pulling on control handle 47. This movement is translated through line 41 to the left wing tip of aft wing 10a and the wing tip move downwardly. Lines 42 and 45 transfer the force to the forward left wing 10a and horizontal tail 10b. Line 46 transfers the force to the intermediate portion of the forward airfoil dropping a substantial portion of that airfoil. Drag is increased on the left side and the aircraft turns left in response. As shown in FIG. 10, the empennage has a vertical fin 31 attached along the top of the airframe and connected to the horizontal tail. The opposite wing tips of the horizontal tail 10b are controlled through lines 45.

The aircraft shown in FIGS. 8–11 may be constructed with the airfoil 10b as a canard, as shown in FIG. 12. The canard has a leading edge 20a, stiffeners 15a. It is attached at the midpoint to the airframe 31a which extends aft for connection to the main wing 10. The control lines 41a, 45a and 46a end in the control handles 47a. The flight control of the aircraft is maintained by manipulation of the handles 47a.

This same aircraft design could be used for hang gliding with the control lines manipulated by the pilot. Also, this aircraft could be tethered to the ground, to a moving vehicle, such as a wheeled or tracked ground vehicle, or boat, to provide an, "eye in the sky," view of a line of travel or increase the range of communications through an attached antennae. A powered aircraft could also be adapted from this design with a motor and fuselage attached to the airframe. Such aircraft could be used as drones or UAV for slow speed surveillance and extended loitering capability. Another use for this manned aircraft would be for personal commuting or other instances requiring slow speed and ESTOL performance.

Figure 13:
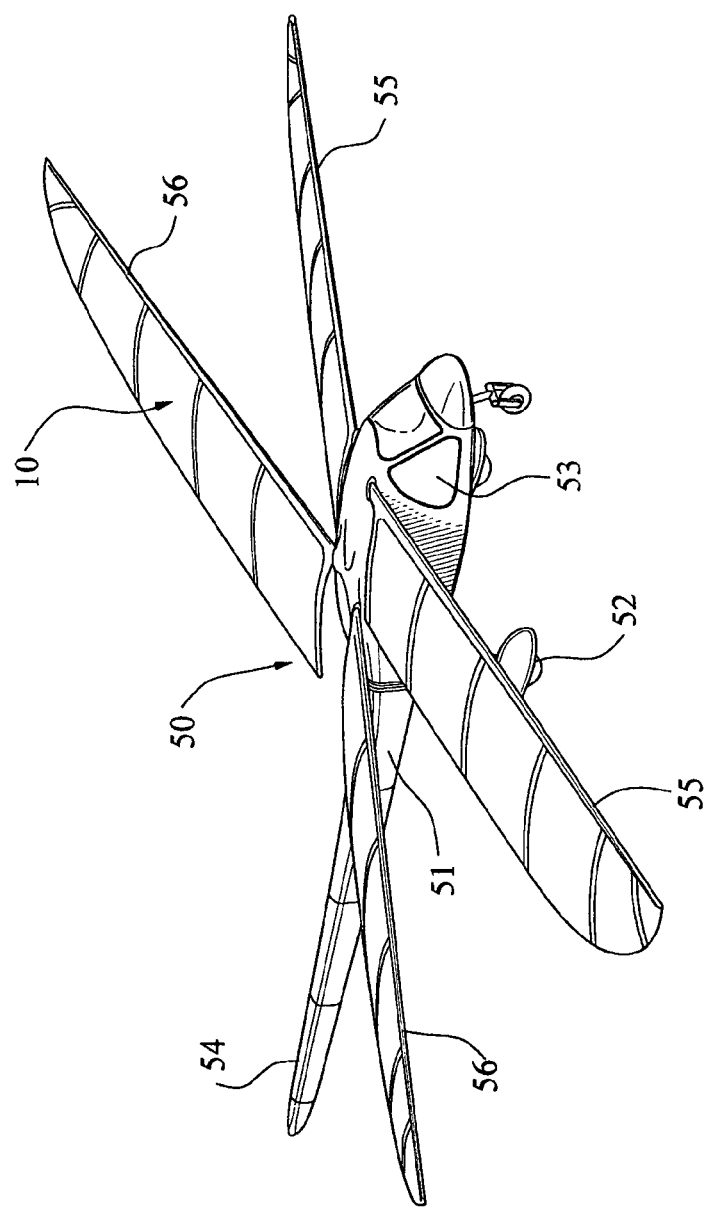
FIG. 13 is a perspective of an ornithopter and airfoil of this invention.

In FIG. 13 the airfoil 10 is shown mounted on an ornithopter 50. The ornithopter 50 includes a fuselage 51 with landing gear 52, a cabin 53 for passengers or payload, an empennage 54 and two sets of wings 55, 56 powered to move perpendicularly to the axis of the fuselage. Each set of wings 55 and 56 operates 180 degrees out of phase to damp vibration in the airframe.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

I claim:

1. In an aerial vehicle capable of controlled flight, an airfoil comprising a flexible wing panel having a leading edge and a trailing edge separated by a chord with a wing tip at each end of said wing panel, said leading edge of said wing panel formed in an arc to increase said length of said chord between each said wing tip, a flexible spar attached to said leading edge whereby said spar is dynamically loaded to conform with said leading edge arc shaping camber to said airfoil wherein said wing panel includes a plurality of stiffeners attached to said wing panel and extending along said chord of said wing panel from said leading edge to said trailing edge and being spaced apart along the length of said wing panel between each said wing tip, said plurality of stiffeners being independent from said flexible spar.

2. In an aerial vehicle of claim 1 wherein said flexible wing panel is formed of a high strength fabric.

3. In an aerial vehicle of claim 1 wherein said flexible wing panel is formed of a high strength film.

4. In an aerial vehicle of claim 1 wherein an arcuate tube is attached to said leading edge of said flexible wing panel, said spar disposed within said tube and extending between each said wing tip.

5. In an aerial vehicle of claim 1 wherein separate control lines are attached to said spar, said separate control lines adapted to be manipulated by a pilot, movement of said separate control lines changing the shape of said wing panel and moving the center of gravity, respectively.

6. In an aerial vehicle of claim 1 wherein said airfoil is attached to an airframe intermediate each said wing tip whereby an equal length of said airfoil is located on opposite sides of said airframe.

7. In an aerial vehicle of claim 1 wherein a plurality of airfoils are attached to an airframe, each said airfoil movably connected to said airframe at one said wing tip whereby at least one airfoil extends on each opposite side of said airframe.

8. In an aerial vehicle of claim 7 wherein one of said plurality of airfoils attached to the airframe is a canard.

9. In an aerial vehicle of claim 1 wherein said arc has a known radius, said spar has a known straight length, said spar extending from one said wing tip to the other said wing tip, said length of said spar approximately 43% of said radius providing camber.

10. In an aerial vehicle of claim 1 wherein said wing panel a plurality of tunnels is formed in said wing panel, said plurality of stiffeners housed in said plurality of tunnels, respectively.

11. In a method of making an airfoil the steps comprising
a) providing a first flat panel of flexible material;
b) shaping said panel in a narrow elongated form having a leading edge and a trailing edge separated by a chord, said leading edge and said trailing edge intersecting at each end of said elongated form;
c) forming said leading edge in an arc such that the intermediate chord is longer than each end;
d) providing a flexible straight spar of a length to extend between said ends of said elongated form;
e) bending said spar and attaching said spar to said arc of said leading edge; and
f) forming camber in said flat panel resulting from the dynamic bending of said spar to conform to said arc including the step of attaching stiffeners solely to said panel extending along the length of said chord at spaced intervals independent of said spar.

12. In a method of making an airfoil of claim 11 including the steps of
a) providing a second flat panel;
b) shaping said second panel in a narrow elongated form having a leading edge and a trailing edge separated by a chord, said leading edge and said trailing edge intersecting at each end of said elongated form,
c) joining said first panel and said second panel along said first and second leading edge whereby the periphery of said first panel and said second panel are approximately co-terminus whereby said first panel is the upper surface of said airfoil and said second panel is the lower surface of said airfoil resulting in camber and thickness of said airfoil.

13. In a method of making an airfoil of claim 11 including the steps of
a) providing said leading edge with a separate hem along said leading edge;
b) folding said hem upon itself to form a sleeve;
c) attaching the free ends of folded sleeve to said panel;
d) providing a straight spar;
e) inserting said straight spar in said sleeve thereby deforming said spar to conform with said sleeve.

14. In a method of making an airfoil of claim 11 including the steps of
a) providing a second flat panel;
b) shaping said second panel in a narrow elongated form having a leading edge and a trailing edge separated by a chord, said leading edge and said trailing edge intersecting at each end of said elongated form,
c) providing said first and second leading edge with a separate hem along said first and second leading edge;
b) folding said hem upon itself to form a sleeve;
c) attaching one of the free ends of folded sleeve to said first panel and the other of the free ends to said second panel such that the periphery of said first and said second panel is approximately co-terminus whereby said first panel is the upper surface of said airfoil and said second panel is the lower surface of said airfoil.

15. In a method of making an airfoil of claim 11 including the steps of forming a plurality of tunnels in said flat panel and inserting said plurality of stiffeners in said plurality of tunnels, respectively.

\* \* \* \* \*